United States Patent Office
3,102,880
Patented Sept. 3, 1963

3,102,880
ISOPHTHALOYLBIS-AMINO ACID COMPOUNDS
Robert D. Rands, Jr., Greendale, Mo., assignor to Mallinckrodt Chemical Works, St. Louis, Mo., a corporation of Missouri
No Drawing. Filed Sept. 6, 1960, Ser. No. 53,889
6 Claims. (Cl. 260—211)

This invention relates to organic compounds and more particularly to certain novel isophthaloyl derivatives of amino acids.

Briefly, the present invention is directed to isophthaloylbis-amino acid compounds of the formula:

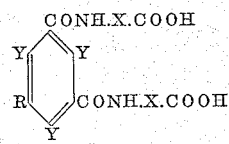

where
R is $NO_2$, $NH_2$ or a lower alkanamido group,
X is a lower alkylene group, and
Y is H or I;
and the pharmaceutically acceptable salts thereof.

The invention also includes methods of preparing the novel compounds of the class described.

Among the objects of the invention may be mentioned the provision of new isophthalic acid derivatives; the provision of new isophthaloylbis-amino acid derivatives; the provision of new iodinated compounds; the provision of novel compounds which are useful intermediates for the preparation of new iodinated isophthaloylbis-amino acid compounds; and the provision of compounds of the type indicated which are useful for the preparation of roentgenographic contrast media. Other objects and features will be in part apparent and in part pointed out hereinafter.

The invention accordingly comprises the products and methods hereinafter described, the scope of the invention being indicated in the following claims.

The present invention is directed to the novel isophthaloylbis-amino acids represented by the formula:

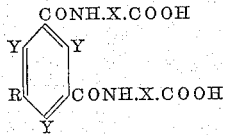

where
R is $NO_2$, $NH_2$ or a lower alkanamido group,
X is a lower alkylene group, and
Y is H or I;
and the pharmaceutically acceptable salts thereof.

As examples of lower alkanamido groups there may be mentioned the acetamido, propionamido and normal and iso-butyramido groups.

As examples of lower alkylene groups, the following may be cited:

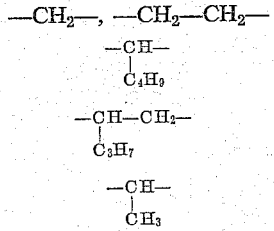

As examples of pharmaceutically acceptable salts there may be mentioned, in particular, the sodium, N-methylglucamine and diethanolamine salts. Other examples within the classes mentioned will occur to those skilled in the art in which the cation of the salt is pharmaceutically acceptable.

The novel compounds of the invention may be prepared from 5-nitroisophthaloyl chloride. This compound may be condensed with two moles of an amino acid (in the form of a salt, such as the sodium salt) to form a 5-nitroisophthaloylbis-amino acid. Reduction of the nitro group, as by catalytic hydrogenation, yields a corresponding 5-amino isophthaloylbis-amino acid. The amino compound may be exhaustively iodinated in acid solution using iodine monochloride as the iodinating agent. The resulting 5-amino-2,4,6-triiodoisophthaloylbis-amino acid may then be acylated, using a known acylating agent, such as acetic anhydride, in the presence of a trace of a strong mineral acid such as sulfuric or perchloric acid.

Pharmaceutically acceptable salts of the novel acids of the invention are conveniently prepared by means well known to those skilled in the art.

The 5-alkanamido-2,4,6-triiodoisophthaloylbis-amino acids of the present invention are useful for the preparation of roentgenographic contrast media. For example, concentrated sterile aqueous solutions of the salts of these acids with non-toxic cations are of low toxicity and contain a high concentration of organically bound and substantially physiologically inert iodine which can be administered intravascularly. The lower members of the series are excreted primarily through the urinary system. The sodium and methylglucamine salts are particularly useful for the preparation of aqueous solutions for intravascular injection in connection with vasographic techniques, such as angiocardiography, peripheral arteriography and venography. Such solutions are also useful in techniques for visualizing structures of the excretory system. Solutions in other pharmaceutically acceptable solvents are also useful for special purposes.

Dispersions of water insoluble derivatives of the acids, such as their amides and esters, are also useful, as for example, in visualizing hollow organs and cavities having external orifices through which the contrast preparation can be introduced in preparation for the examination and removed after the examination is completed.

The compounds are also useful for the preparation of other types of contrast media, such as for example non-aqueous dispersions.

As is evident from the preceding description of the synthetic processes used in preparing the compounds of the invention, the 5-nitroisophthaloylbis-amino acids, as well as the 5-aminoisophthaloylbis-amino acids, both iodinated and uniodinated, are useful intermediates for the preparation of the 5-alkanamidoisophthaloylbis-amino acids and other useful compounds.

Among the major criteria used in the evaluation of iodinated compounds proposed for use in aqueous contrast media solutions are radiopacity and systemic and local tissue toxicity. By these criteria, the preferred compounds of the present series compare favorably with the active ingredients of the better commercial media now in use.

The following examples illustrate the invention.

EXAMPLE 1

*5-Nitroisophthaloyldiglycine*

Finely powdered 5-nitroisophthaloyl chloride (100 g., 0.404 mole) (Journ. Chem. Soc. 1936, 1108), was added to a stirred cold alkaline solution of the sodium salt of glycine (76 g., 1 mole glycine; 70 g., 1.75 moles sodium hydroxide; 400 ml. of water) at such a rate that the temperature never exceeded 10° C. The acid chloride dissolved almost immediately to give a yellow solution which later darkened to a reddish brown. After all the acid chloride had been added (1½–2 hours), the solution was acidified by the addition of concentrated hydrochloric acid. The resulting yellow precipitate was dissolved in ammonia solution and the solution was acidified to pH 5 by the addition of hydrochloric acid. After a treatment with activated charcoal the pale yellow solution was further acidified by the addition of concentrated hydrochloric acid, and the pale yellow precipitate of 5-nitro-isophthaloyldiglycine was collected and dried. Yield, 78 g. (59.3%). Melting point, 170–174° C. Neutral equivalent, 161.9 (theory 162.7).

EXAMPLE 2

*5-Aminoisophthaloyldiglycine*

5-nitroisophthaloyldiglycine (42 g., 0.129 mole) was dissolved in methyl alcohol (250 ml.). A catalyst (2 g. of 5% palladium on charcoal in 10 ml. of water) was added, the mixture was placed in a Parr low pressure hydrogenator and hydrogen was introduced to a pressure of 37 p.s.i. After two hours the pressure had dropped to 4 p.s.i., indicating that the reduction was complete. The catalyst was filtered off, and the pale yellow solution was evaporated to dryness under reduced pressure leaving a residue of crude 5-aminoisophthaloyldiglycine.

EXAMPLE 3

*5-Amino-2,4,6-Triiodoisophthaloyldiglycine*

The residue of crude 5-aminoisophthaloyldiglycine from Example 2 was dissolved in dilute hydrochloric acid (100 ml. of concentrated acid in 1 liter of water). The solution was diluted to 2 liters and was heated and stirred during the addition of a solution of iodine monochloride (73 g., 0.427 mole ICl, in 80 ml. concentrated hydrochloric acid). Heating and stirring was continued until the appearance of a yellow solid (about two hours) and thereafter until titration indicated that 8.4 grams of unreacted iodine monochloride remained. The solution was cooled in the refrigerator, and the yellow precipitate of crude 5-amino-2,4,6-triiodoisophthaloyldiglycine was collected and dried at 60° C. The crude product was dissolved in ammonium hydroxide solution and the resulting solution was acidified to pH 5 with hydrochloric acid and treated with activated charcoal. Addition of hydrochloric acid caused the precipitation of pale yellow 5-amino-2,4,6-triiodoisophthaloyldiglycine. Melting point: Decomposes, 265° C. Calculated for $C_{12}H_{10}N_3O_6I_3$: Neutral equivalent, 336.9; iodine, 56.5%. Found: Neutral equivalent, 335.3; iodine, 54.4%.

EXAMPLE 4

*5-Acetamido-2,4,6-Triiodoisophthaloyldiglycine*

5-amino-2,4,6-triiodoisophthaloyldiglycine (20.2 g., 0.03 mole) was mixed with acetic anhydride (30 ml.) and perchloric acid (5 drops). The mixture was heated to boiling within 5 minutes, then allowed to stand for 3 minutes, after which the black solution was cooled in an ice water bath. When this solution was stirred into 125 ml. of warm water a gum separated. The mixture was then heated on a steam bath under an air jet to hasten evaporation of the dilute acetic acid liquor.

The semi-solid residue was dissolved in 100 ml. of water containing a slight excess of ammonia, and the resulting solution of the ammonium salt was treated 3 times with charcoal, acidified, and cooled. The yellow solution was heated on the steam bath and a slight purple precipitate was removed and discarded. Holding the filtrate at 10° C. for two days yielded 7.8 g. (36%) of 5-acetamido-2,4,6-triiodoisophthaloyldiglycine, M.P. 285–290° C. with decomposition. Calculated for

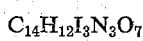

$C_{14}H_{12}I_3N_3O_7$

I, 53.3%; neutral equivalent, 357. Found: I, 52.2; neutral equivalent, 359. The infrared spectrum of the product was in harmony with the postulated structure.

Several runs were made by variants of the above procedure, with yields of 10 to 35%. The yield is increased by complete removal of the acetic acid after hydrolysis of the acetic anhydride. Acidification of solutions of the sodium or ammonium salt does not immediately yield a precipitate; however, crystals form upon evaporation of the warm, acid solution on the steam bath. Charcoal treatment of acidified solutions of the sodium salt to remove color should preferably be carried out at pH 3.5 or below. Sulfuric acid may be substituted for the perchloric acid used in the above procedure.

EXAMPLE 5

*5-Amino-2,4,6-Triiodoisophthaloyldiglycine, Methylglucamine Salt*

5-amino-2,4,6-triiodoisophthaloyldiglycine was slurried in water and N-methylglucamine was added in sufficient quantities to dissolve the acid and adjust the pH to a value of 7.5. Sufficient water was added so that the final solution contained a concentration of 300 mg. of iodine per ml.

The acute intravenous $LD_{50}$ of this salt in male albino mice was found to be approximately 9.9 g./kg.

EXAMPLE 6

*5-Amino-2,4,6-Triiodoisophthaloyldiglycine, Sodium Salt*

5-amino-2,4,6-triiodoisophthaloyldiglycine was slurried in water, and the acid was dissolved and neutralized by the addition of sodium hydroxide. The solution was evaporated to yield the sodium salt of 5-amino-2,4,6-triiodoisophthaloyldiglycine. The solubility of this salt was found to be approximately 100 grams per 100 ml. of solution at 25° C.

EXAMPLE 7

*5-Acetamido-2,4,6-Triiodoisophthaloyldiglycine, Sodium Salt*

5-acetamido-2,4,6-triiodoisophthaloyldiglycine was slurried in water and sodium hydroxide solution was added to dissolve the acid and adjust the pH to 7–8. The solution was evaporated to crystallize the sodium salt of 5-acetamido-2,4,6-triiodoisophthaloyldiglycine. The solubility of this salt at 25° C. was found to be approximately 113 grams per 100 ml. of solution.

The sodium salt was dissolved in sufficient water to form a solution containing 300 mg. I/ml. 0.1% methyl paraben was added as a preservative and the solution was pasteurized by heating it 15 minutes at 80° C. By intravenous administration of this solution to male albino mice, the acute $LD_{50}$ of the sodium salt was found to be approximately 12.1 grams/kg.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

I claim:

1. A compound selected from the group consisting of isophthaloylbis-amino acids of the formula:

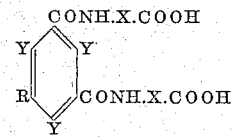

where R is selected from the group consisting of $NH_2$ and lower alkanamido groups, X is a lower alkylene group, and Y is iodine; and the salts thereof with pharmaceutically acceptable cations.

2. 5-amino-2,4,6-triiodoisophthaloyldiglycine.

3. 5-amino-2,4,6-triiodoisophthaloyldiglycine, sodium salt.
4. 5-amino-2,4,6-triiodoisophthaloyldiglycine, N-methylglucamine salt.
5. 5-acetamido-2,4,6-triiodoisophthaloyldiglycine.
6. 5-acetamido-2,4,6-triiodoisophthaloyldiglycine, sodium salt.

References Cited in the file of this patent

UNITED STATES PATENTS 3,009,952   Larsen _____ Nov. 21, 1961

OTHER REFERENCES

Beilstein: Organische Chemie, vol. 9, page 835 (1926).
Wagner et al.: Synthetic Organic Chemistry, pages 98, 566 and 654 (1953). (Copy in Sci. Library.)